United States Patent [19]

Bell

[11] Patent Number: 4,535,826
[45] Date of Patent: Aug. 20, 1985

[54] APPARATUS FOR RAPID REFUELING OF ARMORED FIGHTING VEHICLES

[76] Inventor: Edward D. Bell, 5846 Denny Ave., North Hollywood, Calif. 91601

[21] Appl. No.: 527,422

[22] Filed: Aug. 29, 1983

[51] Int. Cl.³ .............................................. B67D 5/00
[52] U.S. Cl. .................................. 141/231; 141/388; 137/899
[58] Field of Search ................ 280/420, 421; 137/899, 137/899.2, 899.3, 355.16; 141/382, 392, 388, 312, 231–233, 89; 285/62; 89/36 H, 40 B, 40 F

[56] References Cited

U.S. PATENT DOCUMENTS

| 2,948,306 | 8/1960 | Kuraeff | 141/231 |
|---|---|---|---|
| 3,199,553 | 8/1965 | Garrett et al. | 141/233 |
| 3,650,303 | 3/1972 | Chambers et al. | 141/232 |
| 3,774,654 | 11/1973 | Hjermstad | 141/382 |
| 3,814,148 | 6/1974 | Wostl | 141/233 |
| 4,202,372 | 5/1980 | Gibbons | 141/387 X |
| 4,262,696 | 4/1981 | Oury | 141/232 |
| 4,438,793 | 3/1984 | Brown | 141/382 |
| 4,468,166 | 8/1984 | Jameson | 141/231 X |

FOREIGN PATENT DOCUMENTS 1058387  4/1958  Fed. Rep. of Germany ...... 141/388

Primary Examiner—Stephen Marcus
Assistant Examiner—Ernest G. Cusick

[57] ABSTRACT

An apparatus is disclosed herein which enables on armored vehicle, carrying fuel to be dispensed, to refuel another in a rapid and safe manner under extreme circumstances of terrain and battle environment. Liquid fuel transfers from one vehicle, equipped with a boom and probe, into another vehicle equipped with a receptacle for the probe. This connected apparatus allows for misalignments of terrain and position, contamination by dust, mud or chemical agents, and impact by small arms fire.

5 Claims, 4 Drawing Figures

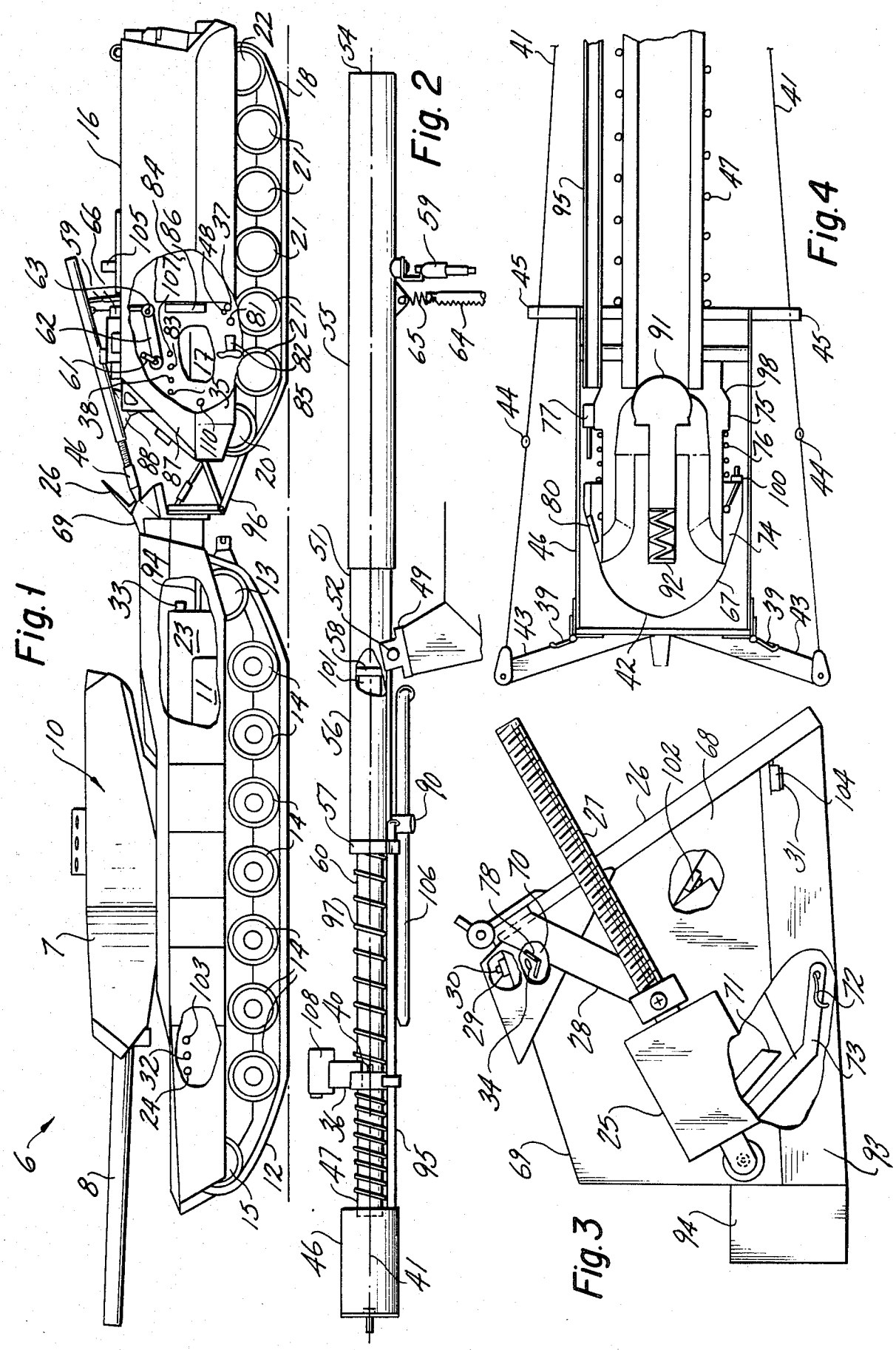

APPARATUS FOR RAPID REFUELING OF ARMORED FIGHTING VEHICLES

BACKGROUND OF THE INVENTION

1. Field of the Invention

The present invention relates to military armored vehicles and, more particularly, to an apparatus that allows refueling quickly on any terrain without exposing personnel to enemy fire or chemical agents.

2. Brief Description of the Prior Art

Armored vehicles, such as tanks, have for many years been refueled by vehicles which were unarmored and unable to go where the armored vehicle could go. Because of this unequal mobility, the tank and the refueler had to rendezvous at some accessible area for the refueling. The actual refueling was performed by men dismounting from their vehicles, dragging hoses from the refueler to the tank, where numerous caps were opened and the fuel directed in.

Recently, some vehicles are available as refuelers which have better terrain mobility, but which are still unarmored and require manual operation of the refueling.

Still more recently, but not yet in operation, a vehicle is being developed which has high mobility and armor, but which still requires stationary manual operation of the refueling.

SUMMARY OF THE INVENTION

The present apparatus permits one armored vehicle to approach, connect with, and rapidly refuel another, in a totally hostile environment. Through the use of electronic components in both vehicles, fuel only flows when proper connection is made, and the receiving vehicle has space for more fuel. When the receiving vehicle is full, fuel flow stops.

Therefore, an object of this apparatus is that it can be retrofitted to existing vehicles at a lower cost than a new vehicle.

Another object of the present invention is that the vehicles intended for this apparatus have the same mobility as the tanks they refuel.

Still another object of the present invention is that the vehicle intended for this apparatus is armored to protect crew and fuel from small arms fire.

Still another object of the present invention is that the vehicle intended for this apparatus is sealed and pressurized to prevent entry of chemical contaminants.

Yet another object of the present invention is that this apparatus has the ability to refuel a tank in one quarter the time of conventional methods.

Yet another object of the present invention is that this apparatus can refuel an armored vehicle remotely, i.e., no personnel need drag hoses or open caps.

A further object of the present invention is to provide a refueler with automated systems which permit operation without extensive personnel training.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIG. 1 is a side elevational view of the novel connection of two armored vehicles for the purpose of transferring fuel;

FIG. 2 is an enlarged side elevational view of the extended boom which is shown compressed in FIG. 1;

FIG. 3 is an enlarged side elevational view of the receptacle shown open in FIG. 1; and FIG. 4 is an enlarged side elevational cut-away view of the bottom probe and cover as shown in FIGS. 1 and 2.

DESCRIPTION OF THE PREFERRED EMBODIMENT

Referring to FIG. 1, two armored vehicles are indicated in the general direction of arrow 6 which comprises a motorized main battle tank 7, having a gun 8, armored turret 10, and an engine 11 driving track 12 through drive sprocket 13 where road wheels 14 carry the load while idler wheel 15 aligns the track 12. The second vehicle 16 is an armored refueler vehicle, whose engine 17 drives track 18 with drive sprocket 20. Road wheels 21 carry the load while idler wheel 22 aligns the track 18.

When main battle tank 7 runs low on fuel in its tanks 23, it calls for the assistance of refueler vehicle 16. Actuating switch 24 in vehicle 7 energizes motor 25 which opens door 26 by means of screw jack 27 and lever 28. Motor 25 is turned OFF by limit switch 30 when fully open. When door 26 is fully open, limit switches 29 and 31 are actuated which activates door open light 32, float switch 33 and magnetic coil 34.

As refueler vehicle 16 approaches main battle tank 7, the driver actuates switch 35 which activates motors 36, solenoid valve 37 and cover open light 38. By means of reel 40, motors 36 pull cables 41 which open doors 42 by means of lever 43. When stop 44 reaches guide 45, entire cover 46 is pulled back against spring 47. It is then held in the full back position by motors 36.

When solenoid valve 37 is opened, it closes limit switch 48 in the pump relay circuit. Referring to FIG. 2, boom 51 is statically balanced on pivot 52 with weight 54 in balance tube 55. Pivots 52 are secured to outer tube 56 which holds roller housing 57. Inside roller housing 58 is mounted on the end of inner tube 60.

The driver of refueler vehicle 16 steers his vehicle to make azimuth alignment adjustments for boom 51 and receptacle 69 in main battle tank 7. For elevation adjustments of boom 51, the driver turns crank 61, which through chain 62 drives pinion 63, driving rack 64. Rack 64 elevates boom 51 through spring 65. Spring 65 and ball and socket mount 66 allow for misalignment of rack 64 with boom 51.

As contact is made between probe head 67 and receptacle bevel walls 68, the last few inches of alignment are forced onto boom 51. As probe head 67 penetrates receptacle opening 70, it forces the inner receptacle door 71 open against spring 72 through lever 73. As probe head 67 continues to penetrate receptacle 69, sleeve 74 of probe 75 contacts receptacle opening 70 and is forced back against spring 76 and limit switch 77. As sleeve 74 seats against receptacle opening seal 78, magnetic switch 80 senses activated magnetic coil 34 and closes. Now, with the magnetic switch 80, the limit switch 77 and the valve limit switch 48 all closed, the pump relay 81 is activated. This closes the circuit which activates the pump motor 82. A pump indicator light 83 also lights at this time. Fuel is now flowing out of a collapsible bladder fuel tank 84 through the pump 85, through the filter 86, out through the glacis plate 87, through armored hose 88 and into the boom 51 through fitting 90. When fuel pressure strikes the anti drip poppet valve 91, it is forced open against its spring 92. Fuel flows out around probe head 67 and into the receptacle floor 93, where it drains through tubing 94 into fuel tanks 23. The wiring for the magnetic switch 80 and limit switch 77 travel through armored tube 95. When contact is made between the probe 75 and the receptacle 69, the driver continues to push until solid contact is made between the back of the main battle tank 7 and the shock absorbing bumper 96 on the front of the refueler vehicle 16. This contact ensures proper sealing of the probe sleeve 74 and the receptacle opening seal 78. After contact is made between the probe 75 and the receptacle 69, and movement continues, the inner tube 60 rolls into the outer tube 56 against spring 97. This keeps a nearly constant sealing pressure and prevents damage to the probe 75 during violent engagements. Sleeve 74 to housing 98 movement can be lubricated through fitting 100.

When the main battle tank 7 fuel tanks 23 are full, float switch 33 opens, deactivating magnetic coil 34. Magnetic switch 80 then opens, which opens pump relay 81 and the pump motor 82 stops. At this time, the pump indicator light 83 goes out. When pump indicator light 83 goes out, the driver knows it is time to disconnect. When fuel pressure ceases, anti drip poppet valve 91 is closed by spring 92. When the refueler vehicle 16 backs away from the main battle tank 7, inner tube 60 is rolled out of outer tube 56 by spring 97 until spacer 101 is caught between roller housings 57 and 58. Further backing withdraws probe head 67 from receptacle opening 70. This permits inner receptacle door 71 to be closed by spring 72, and sleeve 74 to be closed by spring 76. When inner receptacle door 71 closes, it actuates dual switch 102 which closes the door circuit for motor 25, permitting door 26 to close, and opens the circuit which turns off the probe inserted indicator light 103. When the probe inserted indicator light 103 goes out, the driver of the main battle tank 7 actuates switch 24 which activates motor 25 to close door 26. Motor 25 is turned off by limit switch 104 when door 26 is fully closed. When door 26 closes, limit switch 31, in the magnetic coil 34 circuit, is opened, and limit switch 29 is opened which turns off door open light 32. When clear, the driver of the refueler vehicle 16 actuates switch 35 which stops current to the motors 36, turns off cover open light 38, and closes solenoid valve 37. With no current to the motors 36, spring 47 slides cover 46 forward and permits doors 42 to be closed by springs 39.

The boom 51 is free to pitch on pivot 52 and yaw on swivel mount 49. All movements are dampened by two dampers 59. For long distance travel, the driver of the refueler vehicle 16 operates crank 61 to raise the boom 51 until the balance tube 55 seats in saddle 105. In the event of fire in the receptacle 69 during refueling, the driver of the refueler vehicle 16 pulls a lever 110 which discharges fire extinguisher from tube 106 mounted on boom 51. For night operations, the driver of refueler vehicle 16 can actuate switch 107 to operate laser aiming lamp 108 or video camera 108.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. Apparatus for remotely transferring fuel between armored and/or tracked ground vehicles comprising the combination of:
   a mobile storage or tanker vehicle having a quantity of liquid fuel stored therein;
   a mobile fuel consuming vehicle;
   fuel dispensing means operably carried on said storage vehicle for conducting stored fuel therefrom which includes an elongated pivoting telescoping boom outwardly cantilevered from a selected end of said storage vehicle and terminating at its free end in a nozzle configured for operation without human contact;
   a remotely operating cover enclosing said nozzle resiliently carried on said boom including a pair of doors having open and closed positions responsive to control means for exposing and covering said nozzle;
   receptacle mean carried on said fuel consuming vehicle at a selected end thereof for insertably receiving said exposed nozzle for receiving fuel from said storage vehicle in a remote manner;
   spacing means operably carried on said selected ends of said vehicle for abutting engagement to establish a predetermined spacing or distance between said vehicle selected ends; and
   said predetermined spacing or distance related to said insertable reception penetration depth of said dispensing means within said receptacle means.

2. The invention as defined in claim 1 wherein:
   said dispensing means and said receiving means are operatively and releasably joined together during coordinated movement of said mobile vehicles.

3. The invention as defined in claim 1 including:
   control means for starting and stopping fuel flow through said boom into said receptacle.

4. Apparatus for remotely transferring fuel between armored and/or tracked ground vehicles comprising the combination of:
   a mobile storage or tanker vehicle having a quantity of liquid fuel stored therein;
   a mobile fuel consuming vehicle;
   fuel dispensing means operably carried on said storage vehicle for conducting stored fuel therefrom which includes an elongated pivoting telescoping boom outwardly cantilevered from a selected end of said storage vehicle and terminating at its free end in a nozzle configured for operation without human contact;
   a remotely operating cover enclosing said nozzle resiliently carried on said boom including a pair of doors having open and closed positions responsive to control means for exposing and covering said nozzle;
   receptacle means carried on said fuel consuming vehicle at a selected end thereof for insertably receiving said exposed nozzle for receiving fuel from said storage vehicle in a remote manner;
   said boom includes a probe about said nozzle for engaging with said receptacle;

actuation means carried in said receptacle responsive to said probe for accessing through said receptacle to transfer fuel; and said actuation means includes magnetic field producing means detected by a magnetic sensor means in said boom probe.

5. The invention as defined in claim 4 including;

spacing means operably carried on said selected ends of said vehicle for abutting engagement to establish a predetermined spacing or distance between said vehicle selected ends;

said predetermined spacing or distance related to said insertable reception penetration depth of said dispensing means within said receptacle means; and shock absorbing means operably carried on the front end of said storage vehicle for abutting engagement with said consuming vehicle during a refueling procedure.

* * * * *